United States Patent Office

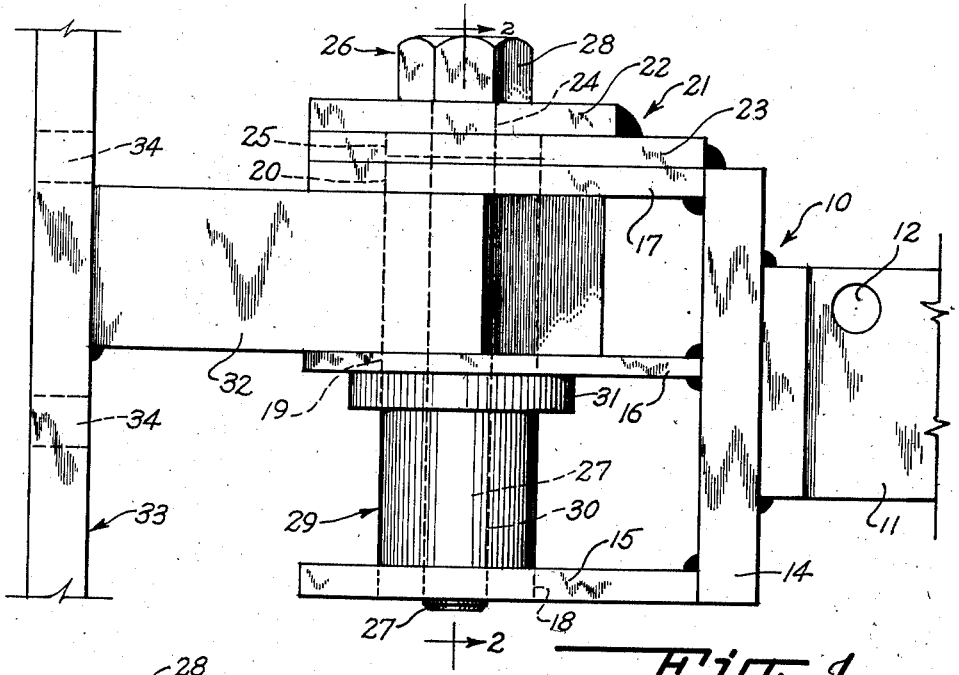
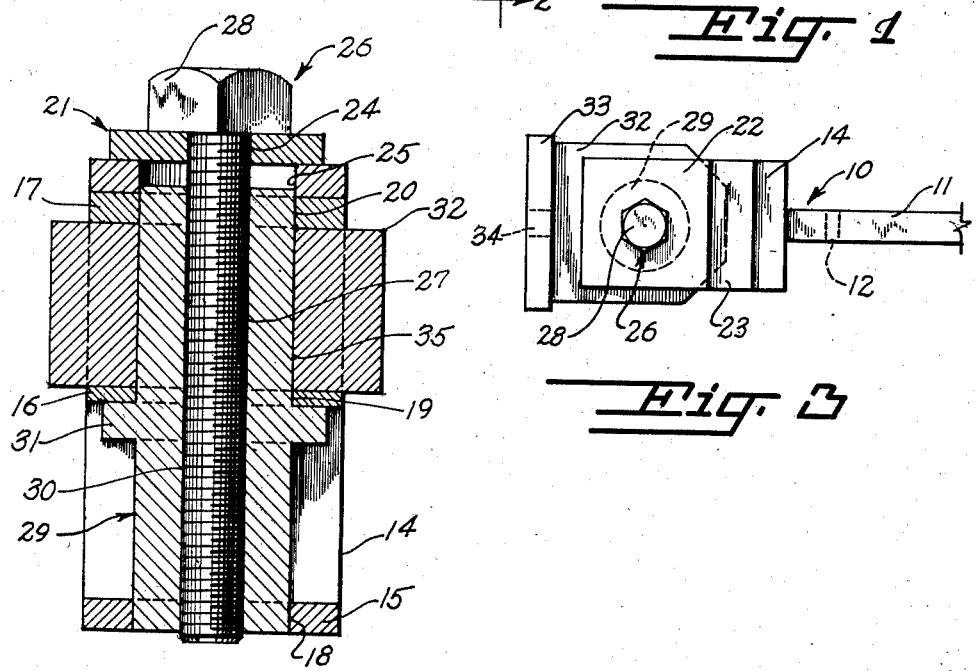

2,699,569
Patented Jan. 18, 1955

2,699,569

ADJUSTABLE HINGE AND TRAILER HITCH COMBINED WITH ADJUSTABLE PIN

Sam Gore, Vero Beach, Fla.

Application August 1, 1952, Serial No. 302,104

3 Claims. (Cl. 16—140)

This invention relates to a hinge, and more particularly to an adjustable hinge and trailer hitch combined with an adjustable pin.

The object of the invention is to provide a hinge which is adapted to be manually adjusted so that a gate, or other body will remain immobile in its various adjusted positions.

Another object of the invention is to provide a hinge which can be adjusted, loosened or tightened by hand and whereby the hinge of the present invention will not accidentally become loosened from its adjusted position due to vibration or other causes, the hinge of the present invention serving to hold a gate or door open without the necessity of using stop members, the present invention being especially suitable for farm use whereby gates for cattle and the like can be opened to permit the passage therethrough of the cattle, the present invention also adapted to be used on all types of machines and other implements or equipment which are subject to vibration.

A further object of the invention is to provide an adjustable hinge and trailer hitch combined with an adjustable pin which is extremely simple and inexpensive to manufacture.

Other object and advantages will be apparent during the course of the following description.

In the accompanying drawings, forming a part of this application, and in which like numerals are used to designate like parts throughout the same:

Figure 1 is a side elevational view of the hinge, constructed according to the present invention;

Figure 2 is a sectional view taken on the line 2—2 of Figure 1;

Figure 3 is a top plan view of the hinge.

Referring in detail to the drawings, the numeral 10 designates a support member which may be fabricated of any suitable material such as metal, and the support member 10 includes a bracket 11 which is provided with one or more openings 12 for receiving a suitable securing element such as a screw or bolt and nut assembly whereby the support member can be attached to a suitable supporting structure. Extending transversely with respect to the bracket 11 and secured thereto as by welding is a web 14.

Extending from the web 14 and secured thereto as by welding is a plurality of spaced parallel arms 15, 16 and 17, Figure 1. The arm 15 is provided with an opening which registers with an opening 19 in the arm 16, there being an aligned opening 20 in the other arm 17 for a purpose to be later described.

Arranged contiguous to the arm 17 is a washer assembly 21, and the washer assembly 21 includes a pair of superposed plates 22 and 23 which are secured together as by welding. The plate 22 which is the uppermost plate is provided with a central aperture 24, while the plate 23 is provided with an opening 25 that has the same diameter as the opening 20.

Extending through these registering openings and apertures is a bolt 26. The bolt 26 includes an exteriorly threaded shank 27 and a hexagonal shaped head 28. Arranged in threaded engagement with the bolt 26 is a pin 29, the pin 29 being provided with a longitudinally extending threaded passageway 30 for threadedly receiving the threaded shank 27. Formed integral with the pin 29 or secured thereto is an annular shoulder 31, and upon manual rotation of the pin 29, the shoulder 31 will abut or engage the arm 16.

Mounted for swinging or pivotal movement with respect to the support member 10 is a body member 33. The body member 33 is provided with suitable openings 34 for the projection therethrough of suitable securing elements such as screws or bolts whereby the body member 33 can be attached to any desired structure as for example a gate or door. Arranged at right angles with respect to the body member 33 and secured thereto is a tongue 32, the tongue 32 being interposed between the arms 16 and 17. The tongue 32 is provided with a cutout or opening 35 which rotatably receives therein a portion of the pin 29. The arm 15 is provided with the opening 18 for the projection therethrough of the portion of the pin 29 below the shoulder 31 whereby selective relative rotation between these parts can be effected. Also, the parts 15 and 29 coact to provide an additional guide or bearing surface.

In use, the support member 10 may be attached to any suitable supporting structure by any suitable means, as for example by securing elements passing through the openings 12. The body member 33 may be attached to any desired object such as a gate or door by securing elements passing through the openings 34. Then, if it is desired to permit normal pivotal or swinging movement of the door or gate, the pin 29 can be manually loosened on the bolt 26. Thus, with the pin 29 loosened on the bolt 26, the tongue 32 will be free to rotate between the arms 16 and 17 so that the gate or door can swing freely. Then, to hold the door or gate immobile in its adjusted or open position, the pin 29 is manually tightened on the bolt 26. As the pin 29 is manually rotated, the shoulder 31 will abut or engage the arm 16 to thereby cause the arm 16 to exert friction on the tongue 32 whereby pivotal movement of the tongue 32 will be prevented until the pin 29 is again manually loosened on the bolt 26.

The tongue 32 is immobile except that it can swing about the pin 29. It will be seen that the tongue is slightly smaller than the space between the arms 16 and 17 so that when additional tension is exerted on the bolt 26, there will be a tendency for the washer assembly 21 and the shoulder 31 to be pulled together thus applying additional friction on the tongue 32 to cause the tongue 32 to be locked in place.

The hinge of the present invention can be adjusted, loosened or tightened by hand and will not vibrate loose and will stay tight at all times. The hinge of the present invention is adapted to be used on doors and gates and can be manually adjusted by hand so that when the gate or door is opened the hinge will hold the gate or door in place without requiring the use of any stops and whereby the hinge can be manually adjusted so as to open the gate or door at any given point. The hinge is especially suitable for use on farms where it is desirable to have gates for cattle and other animals kept open so that the cattle can pass therethrough whereby the necessity of having someone standing by and holding the gate open to let the animals pass through will be eliminated. Also, the adjustable pin may be used for purposes other than to hold gates and doors open and can be used for any purpose for which the pin will fit as a pin such as for use on farm machinery and other equipment and implements wherever vibration is extremely prevalent.

What is claimed is:

1. In an adjustable hinge, a support member including a web, a bracket extending from said web and adapted to be secured to a supporting structure, a pair of outer arms and an intermediate arm extending from said web and secured thereto, said arms being arranged in spaced parallel relation with respect to each other, said arms being provided with reigstering openings, a washer assembly arranged contiguous to the outer surface of one of said outer arms and secured thereto, said washer assembly including a pair of plates, the longitudinal axis of said plates being parallel to the longitudinal axis of said arms, the innermost of said plates being provided with an opening of the same size as the opening in the adjacent arm, the other plate being provided with an aperture of less diameter than said openings, said outermost plate being of greater size than the opening in said innermost plate, a bolt having an exteriorly threaded shank etxending through said aperture and openings, a pin provided with a longitudinally extending bore for threadedly receiving said shank, an annular shoulder arranged on said pin intermediate the ends thereof for engaging said intermediate arm upon manual rotation of said pin, a body member mounted for pivotal movement with respect to said support member, and a tongue extending from said body member and interposed between the intermediate arm and the outer arm having the washer assembly arranged contiguous thereto, said tongue being provided with an opening therein for receiving said pin.

2. In an adjustable hinge, a support member including a web, a bracket extending from said web and adapted to be secured to a supporting structure, a pair of outer arms and an intermediate arm extending from said web and secured thereto, said arms being arranged in spaced parallel relation with respect to each other, said arms having the same length, said arms being provided with registering openings, a washer assembly arranged contiguous to the outer surface of one of said outer arms and secured thereto, said washer assembly including a pair of plates, the longitudinal axis of said plates being parallel to the longitudinal axis of said arms, the innermost of said plates being provided with an opening of the same size as the opening in the adjacent arm, the other plate being provided with an aperture of less diameter than said openings, said outermost plate being of greater size than the opening in said innermost plate, a bolt having an exteriorly threaded shank extending through said aperture and openings, a pin provided with a longitudinally extending bore for threadedly receiving said shank, an annular shoulder arranged on said pin intermediate the ends thereof for engaging said intermediate arm upon manual rotation of said pin, a body member mounted for pivotal movement with respect to said support member, a tongue extending from said body member and interposed between the intermediate arm and the outer arm having the washer assembly arranged contiguous thereto, said tongue being provided with an opening therein for receiving said pin, said bolt having a hexagonal shaped head on one end thereof, said tongue being arranged at right angles with respect to said body member.

3. An adjustable hinge comprising a support member including a web, a bracket extending from said web and adapted to be secured to a supporting structure, a pair of outer arms and an intermediate arm etxending from said web and secured thereto, said arms being arranged in spaced parallel relation with respect to each other, said arms having the same length, said arms being provided with registering openings, a washer assembly arranged contiguous to the outer surface of one of said outer arms and secured thereto, said washer assembly including a pair of plates, the longitudinal axis of said plates being parallel to the longitudinal axis of said arms, the innermost of said plates being provided with an opening of the same size as the opening in the adjacent arm, the other plate being provided with an aperture of less diameter than said openings, said outermost plate being of greater size than the opening in said innermost plate, a bolt having an exteriorly threaded shank extending through said aperture and openings, said bolt including a hexagonal shaped head, a pin provided with a longitudinally extending threaded bore for threadedly receiving said shank, an annular shoulder arranged on said pin intermediate the ends thereof for engaging said intermediate arm upon manual rotation of said pin, a body member mounted for pivotal movement with respect to said support member, said body member being arranged parallel to said web, and a tongue extending from said body member and interposed between the intermediate arm and the outer arm having the washer assembly arranged contiguous thereto, said tongue being provided with an opening therein for receiving said pin, said tongue being arranged at right angles with respect to said body member, the thickness of said tongue being slightly less than the space between the adjacent arms.

References Cited in the file of this patent

UNITED STATES PATENTS

| | | | |
|---|---|---|---|
| 347,124 | Oudin | | Aug. 10, 1886 |
| 1,569,089 | Janca | | Jan. 12, 1926 |
| 1,619,107 | Enright | | Mar. 1, 1927 |
| 2,607,949 | Lyon | | Aug. 26, 1952 |

FOREIGN PATENTS

| | | |
|---|---|---|
| 277,881 | Great Britain | Sept. 29, 1927 |